US012579832B2

(12) United States Patent
Young et al.

(10) Patent No.: US 12,579,832 B2
(45) Date of Patent: Mar. 17, 2026

(54) LIDAR MANAGED IMAGE GENERATION

(71) Applicant: Capital One Services, LLC, McLean, VA (US)

(72) Inventors: Johnny Young, New York, NY (US); Amith Kumar Ramachandran, Brunswick, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/736,782

(22) Filed: Jun. 7, 2024

(65) Prior Publication Data

US 2025/0378706 A1     Dec. 11, 2025

(51) Int. Cl.
| | |
|---|---|
| *G06V 30/14* | (2022.01) |
| *G01S 17/86* | (2020.01) |
| *G06V 30/12* | (2022.01) |
| *G06V 30/41* | (2022.01) |

(52) U.S. Cl.
CPC ........ *G06V 30/1437* (2022.01); *G06V 30/133* (2022.01); *G06V 30/1444* (2022.01); *G06V 30/41* (2022.01); *G01S 17/86* (2020.01)

(58) Field of Classification Search
CPC ............. G06V 30/1437; G06V 30/133; G06V 30/1444; G06V 30/41; G01S 17/86
See application file for complete search history.

(56) References Cited

U.S. PATENT DOCUMENTS

| | | | |
|---|---|---|---|
| 5,515,451 | A | 5/1996 | Tsuji et al. |
| 7,391,934 | B2 | 6/2008 | Goodall et al. |

| | | | |
|---|---|---|---|
| 7,421,107 | B2 | 9/2008 | Lugg |
| 7,526,117 | B2 | 4/2009 | Foth et al. |
| 7,587,066 | B2 | 9/2009 | Cordery et al. |
| 7,698,222 | B1 | 4/2010 | Bueche |

(Continued)

FOREIGN PATENT DOCUMENTS

| | | |
|---|---|---|
| JP | 2020021419 A | 2/2020 |
| KR | 2570769 B1 | 8/2023 |

OTHER PUBLICATIONS

International Search Report and Written Opinion for International Application No. PCT/US2025/032411, mailed on Aug. 7, 2025, 16 pages.

(Continued)

*Primary Examiner* — Shahbaz Nazrul
(74) *Attorney, Agent, or Firm* — Sterne, Kessler, Goldstein & Fox P.L.L.C.

(57)                ABSTRACT

A computer implemented method, system, and non-transitory computer-readable device that may be used in a remote deposit environment. Upon receiving a user request, based on interactions with the UI, the method implements an electronic deposit of a financial instrument by activating a camera on the client device to generate a LIDAR managed live video stream of image data of a field of view of at least one camera, wherein the live video stream includes high quality confidence scored imagery of at least a portion of each side of the financial instrument. The method continues by extracting data fields based on the formation of image objects of each side of the financial instrument from the live video stream of image data. The extracted data fields are communicated to a remote deposit server to complete the remote deposit.

20 Claims, 9 Drawing Sheets

(56) References Cited

U.S. PATENT DOCUMENTS

| | | |
|---|---|---|
| 7,702,588 B2 | 4/2010 | Gilder et al. |
| 7,734,545 B1 | 6/2010 | Fogliano et al. |
| 7,818,307 B1 | 10/2010 | Young et al. |
| 7,856,402 B1 | 12/2010 | Kay |
| 7,905,396 B2 | 3/2011 | Tidwell et al. |
| 7,949,587 B1 | 5/2011 | Morris et al. |
| 8,027,928 B1 | 9/2011 | Hecht, Jr. et al. |
| 8,050,997 B1 | 11/2011 | Nosek et al. |
| 8,060,442 B1 | 11/2011 | Hecht et al. |
| 8,104,676 B2 | 1/2012 | Ramachandran |
| 8,213,782 B2 | 7/2012 | Jelinek |
| 8,271,381 B2 | 9/2012 | O'Brien et al. |
| 8,290,876 B1 | 10/2012 | Powell |
| 8,296,230 B2 | 10/2012 | Davis et al. |
| 8,300,917 B2 | 10/2012 | Borgia et al. |
| 8,332,329 B1 | 12/2012 | Thiele |
| 8,406,500 B2 | 3/2013 | Najari et al. |
| 8,464,933 B1 | 6/2013 | Prasad et al. |
| 8,582,862 B2 | 11/2013 | Nepomniachtchi et al. |
| 8,605,982 B2 | 12/2013 | Jackson et al. |
| 8,626,661 B2 | 1/2014 | Gilder |
| 8,632,001 B1 | 1/2014 | Ramachandran et al. |
| 8,638,363 B2 | 1/2014 | King et al. |
| 8,639,105 B2 | 1/2014 | Ogino |
| 8,708,227 B1 | 4/2014 | Oakes, III et al. |
| 8,745,073 B2 | 6/2014 | Mulligan et al. |
| 8,811,711 B2 | 8/2014 | Calman et al. |
| 8,885,963 B2 | 11/2014 | Coleman |
| 8,958,605 B2 | 2/2015 | Amtrup et al. |
| 8,959,033 B1 | 2/2015 | Oakes, III et al. |
| 8,983,170 B2 | 3/2015 | Nepomniachtchi et al. |
| 8,995,012 B2 | 3/2015 | Heit et al. |
| 9,064,248 B2 | 6/2015 | Huff et al. |
| 9,324,073 B2 | 4/2016 | Nepomniachtchi et al. |
| 9,384,392 B2 | 7/2016 | Weber et al. |
| 9,483,761 B2 | 11/2016 | Brendell et al. |
| 9,558,493 B2 | 1/2017 | Carrott |
| 9,569,756 B1 | 2/2017 | Bueche, Jr. et al. |
| 9,640,041 B2 | 5/2017 | Block et al. |
| 9,652,690 B2 | 5/2017 | Eid et al. |
| 9,672,510 B2 | 6/2017 | Roach et al. |
| 9,679,281 B2 | 6/2017 | Moshal |
| 9,684,920 B2 | 6/2017 | Kalgi et al. |
| 9,721,177 B2 | 8/2017 | Lee et al. |
| 9,747,509 B2 | 8/2017 | Eid et al. |
| 9,779,392 B1 | 10/2017 | Prasad et al. |
| 9,807,263 B2 | 10/2017 | Bala et al. |
| 9,852,406 B2 | 12/2017 | Doyle et al. |
| 9,852,409 B2 | 12/2017 | Artman et al. |
| 10,013,591 B2 | 7/2018 | Todeschini |
| 10,026,119 B2 | 7/2018 | Green et al. |
| 10,121,039 B2 | 11/2018 | Todeschini et al. |
| 10,192,108 B2 | 1/2019 | Nepomniachtchi et al. |
| 10,210,522 B1 | 2/2019 | Medina, III et al. |
| 10,217,375 B2 | 2/2019 | Waldron et al. |
| 10,402,790 B1 | 9/2019 | Clark et al. |
| 10,438,987 B2 | 10/2019 | Mandai et al. |
| 10,460,381 B1 | 10/2019 | Pollack et al. |
| 10,504,185 B1 | 12/2019 | Buentello |
| 10,552,810 B1 | 2/2020 | Ethington et al. |
| 10,635,898 B1 | 4/2020 | Pribble et al. |
| 10,692,230 B2 | 6/2020 | Anderson et al. |
| 10,699,146 B2 | 6/2020 | Shustorovich et al. |
| 10,706,466 B1 | 7/2020 | Ethington et al. |
| 10,762,579 B2 | 9/2020 | Riechers et al. |
| 10,769,598 B1 | 9/2020 | Oakes, III et al. |
| 10,789,496 B2 | 9/2020 | Kotovich et al. |
| 10,853,771 B2 | 12/2020 | Enobakhare |
| 10,855,914 B1 | 12/2020 | Prasad et al. |
| 10,909,362 B2 | 2/2021 | Nepomniachtchi et al. |
| 11,064,111 B1 | 7/2021 | Prasad et al. |
| 11,068,867 B1 | 7/2021 | Tucker |
| 11,126,975 B2 | 9/2021 | Haldenby et al. |
| 11,127,008 B1 | 9/2021 | Buentello et al. |
| 11,145,169 B2 | 10/2021 | Pratten et al. |
| 11,157,731 B2 | 10/2021 | Nepomniachtchi et al. |
| 11,159,733 B2 | 10/2021 | Mukul |
| 11,200,550 B1 | 12/2021 | Singfield |
| 11,210,379 B1 | 12/2021 | Lindley et al. |
| 11,216,884 B1 | 1/2022 | Buentello |
| 11,222,313 B2 | 1/2022 | Doyle et al. |
| 11,244,302 B2 | 2/2022 | Ekpenyong et al. |
| 11,244,319 B2 | 2/2022 | Navarro et al. |
| 11,282,086 B1 | 3/2022 | Medina, III et al. |
| 11,288,661 B2 | 3/2022 | Hammad et al. |
| 11,295,377 B1 | 4/2022 | Ethington et al. |
| 11,295,378 B1 | 4/2022 | Voutour et al. |
| 11,315,217 B2 | 4/2022 | Ilic et al. |
| 11,321,709 B1 | 5/2022 | Kolchin |
| 11,373,150 B1 | 6/2022 | Bueche, Jr. et al. |
| 11,417,001 B1 | 8/2022 | Bloch et al. |
| 11,449,841 B1 | 9/2022 | Srinivasarangan et al. |
| 11,516,383 B2 | 11/2022 | Ilic et al. |
| 11,531,973 B1 | 12/2022 | Prasad et al. |
| 11,539,848 B2 | 12/2022 | Roach et al. |
| 11,562,332 B1 | 1/2023 | Oakes, III et al. |
| 11,610,294 B2 | 3/2023 | Dewitt et al. |
| 11,640,627 B2 | 5/2023 | Fotso et al. |
| 11,676,285 B1 | 6/2023 | Backlund et al. |
| 11,682,222 B1 | 6/2023 | Oakes, III et al. |
| 11,694,268 B1 | 7/2023 | Buentello |
| 11,704,627 B2 | 7/2023 | Gordon et al. |
| 11,710,210 B1 | 7/2023 | Medina, III |
| 11,798,253 B2 | 10/2023 | Pribble et al. |
| 11,810,382 B2 | 11/2023 | Laza et al. |
| 11,829,962 B2 | 11/2023 | Burnam et al. |
| 11,900,755 B1 | 2/2024 | Bueche, Jr. |
| 12,229,738 B1 * | 2/2025 | Fietsam ................. G06N 20/00 |
| 12,266,145 B1 * | 4/2025 | Sureka ................. G06V 10/235 |
| 12,347,221 B1 * | 7/2025 | Sureka ............. G06V 30/19093 |
| 2005/0283444 A1 | 12/2005 | Ekberg |
| 2006/0036537 A1 | 2/2006 | Lawrence et al. |
| 2008/0140579 A1 | 6/2008 | Agarwal |
| 2009/0171839 A1 | 7/2009 | Rosano et al. |
| 2010/0258629 A1 * | 10/2010 | Huang ................. G07D 7/1205 |
| | | 235/468 |
| 2012/0040717 A1 | 2/2012 | Levy et al. |
| 2013/0013491 A1 | 1/2013 | Selway et al. |
| 2013/0054461 A1 | 2/2013 | Gupta et al. |
| 2013/0176473 A1 | 7/2013 | Ogino |
| 2013/0198069 A1 | 8/2013 | Latimer |
| 2013/0204783 A1 | 8/2013 | Klose et al. |
| 2014/0074697 A1 | 3/2014 | Foster |
| 2014/0114852 A1 | 4/2014 | Rajagopal et al. |
| 2014/0122332 A1 | 5/2014 | Viera et al. |
| 2014/0236767 A1 | 8/2014 | Duggal et al. |
| 2015/0032626 A1 | 1/2015 | Dill et al. |
| 2015/0120564 A1 | 4/2015 | Smith et al. |
| 2017/0270508 A1 | 9/2017 | Roach et al. |
| 2017/0309108 A1 | 10/2017 | Sadovsky et al. |
| 2017/0336511 A1 | 11/2017 | Nerurkar |
| 2018/0234472 A1 | 8/2018 | Malakar |
| 2020/0042955 A1 | 2/2020 | Widdows |
| 2020/0334647 A1 | 10/2020 | Malhotra et al. |
| 2020/0387703 A1 * | 12/2020 | Dryer .................. G06V 30/412 |
| 2020/0389600 A1 | 12/2020 | Capurso et al. |
| 2021/0174361 A1 | 6/2021 | Potireddy et al. |
| 2021/0360149 A1 | 11/2021 | Mukul |
| 2022/0245985 A1 | 8/2022 | Bhutani et al. |
| 2022/0277291 A1 | 9/2022 | Roongta et al. |
| 2022/0335393 A1 | 10/2022 | Gupta et al. |
| 2022/0343301 A1 | 10/2022 | Edwards et al. |
| 2022/0358575 A1 | 11/2022 | Smith |
| 2023/0060395 A1 | 3/2023 | Roach et al. |
| 2023/0060464 A1 | 3/2023 | Ceesay |
| 2023/0084370 A1 | 3/2023 | Bradford |
| 2023/0120865 A1 | 4/2023 | Nascimento et al. |
| 2023/0133158 A1 | 5/2023 | Kolchin |
| 2023/0196319 A1 | 6/2023 | Ng et al. |
| 2023/0196706 A1 | 6/2023 | Scott |
| 2023/0209116 A1 | 6/2023 | Leung et al. |
| 2023/0281629 A1 | 9/2023 | Shevyrev et al. |
| 2023/0289808 A1 | 9/2023 | Kolchin |

(56)          References Cited

U.S. PATENT DOCUMENTS

| | | |
|---|---|---|
| 2023/0351782 A1 | 11/2023 | Fitzgerald |
| 2025/0148441 A1* | 5/2025 | Fietsam ............... G06V 30/182 |
| 2025/0209430 A1* | 6/2025 | Franklin .............. G06Q 20/042 |

OTHER PUBLICATIONS

Peterson, M., "iPhone 12 pro LiDAR sensor allows for 6x faster low-light autofocus, instant AR," Retrieved at: https://appleinsider.eom/articles/20/10/13/iphone-12-pro-lidar-sensor-allows-for-6x-faster-low-1iqht-autofocus-instant-ar, Retrieved on: Jul. 21, 2025, (Oct. 2020) 1-9.

Rose, Lydia M. "Modernizing check fraud detection with machine learning." PhD dissertation. Utica College. 2018.

remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (4 pgs).

Dunga et al. "Electronic Booking and Payment Platforms for Inter-Campus E-Bikes". Engineering Proceedings. Jul. 14, 2023. pp. 1-14. vol. 41, Issue 12.

Aletihadpayments. "Aani | Split the bill with your friends". Oct. 16, 2023. Located via YouTube, available at https://www.youtube.com/watch?v=_wys12-0KmE.

Katariya. "Mastering QR Code Payments: A Guide to Seamless and Effortless Transactions". Jun. 12, 2023. Located via Google Web, available at https://www.mooninvoice.com/blog/qr-code-payments/.

PayBy. "PayBy: Easily Split Bills of Group Expenses". Retrieved from the Internet on Dec. 21, 2023. Located via Google Web, available at https://www.payby.com/split-bills.

Natwest. "Request money from someone or split a bill". Retrieved from the Internet on Dec. 21, 2023. Located via Google Web, available at https://www.natwest.com/waystopay/payme.html.

Spoton. "QR Scan & Pay / Order & Pay | SpotOn Order". Jul. 19, 2023. Located via Google Web, available at https://help.spoton.com/space/SK/2457829381/QR+Scan+%26+Pay+%2F+Order+%26+Pay+%7C+SpotOn+Order.

Spoton. "QR Split Payment | SpotOn Order". Jul. 19, 2023. Located via Google Web, available at https://help.spoton.com/space/SK/2262565040/QR+Split+Payment+%7C+SpotOn+Order.

photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.

Abraham, "Moire Pattern Detection using Wavelet Decomposition and Convolutional Neural Network," Amadeus Software Labs Pvt. Ltd, IEEE (2018).

Yang, et al., "Doing More with Moiré Pattern Detection in Digital Photos," Journal of Latex Class Files, vol. 14, No. 8 (Aug. 2021).

Digital Check, "Money Orders Giving You Trouble? We've Got The Solution!" Oct. 1, 2008. Located via Google Web, available at https://www.digitalcheck.com/moneyorders-dcom/.

* cited by examiner

REMOTE CHECK
CAPTURE 100

900

LIDAR MANAGED IMAGE GENERATION

BACKGROUND

As financial technology evolves, banks, credit unions and other financial institutions have found ways to make online banking and digital money management more convenient for users. Mobile banking apps may let you check account balances and transfer money from your mobile device. In addition, a user may deposit paper checks from virtually anywhere using their smartphone or tablet. However, users may have to take pictures and have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
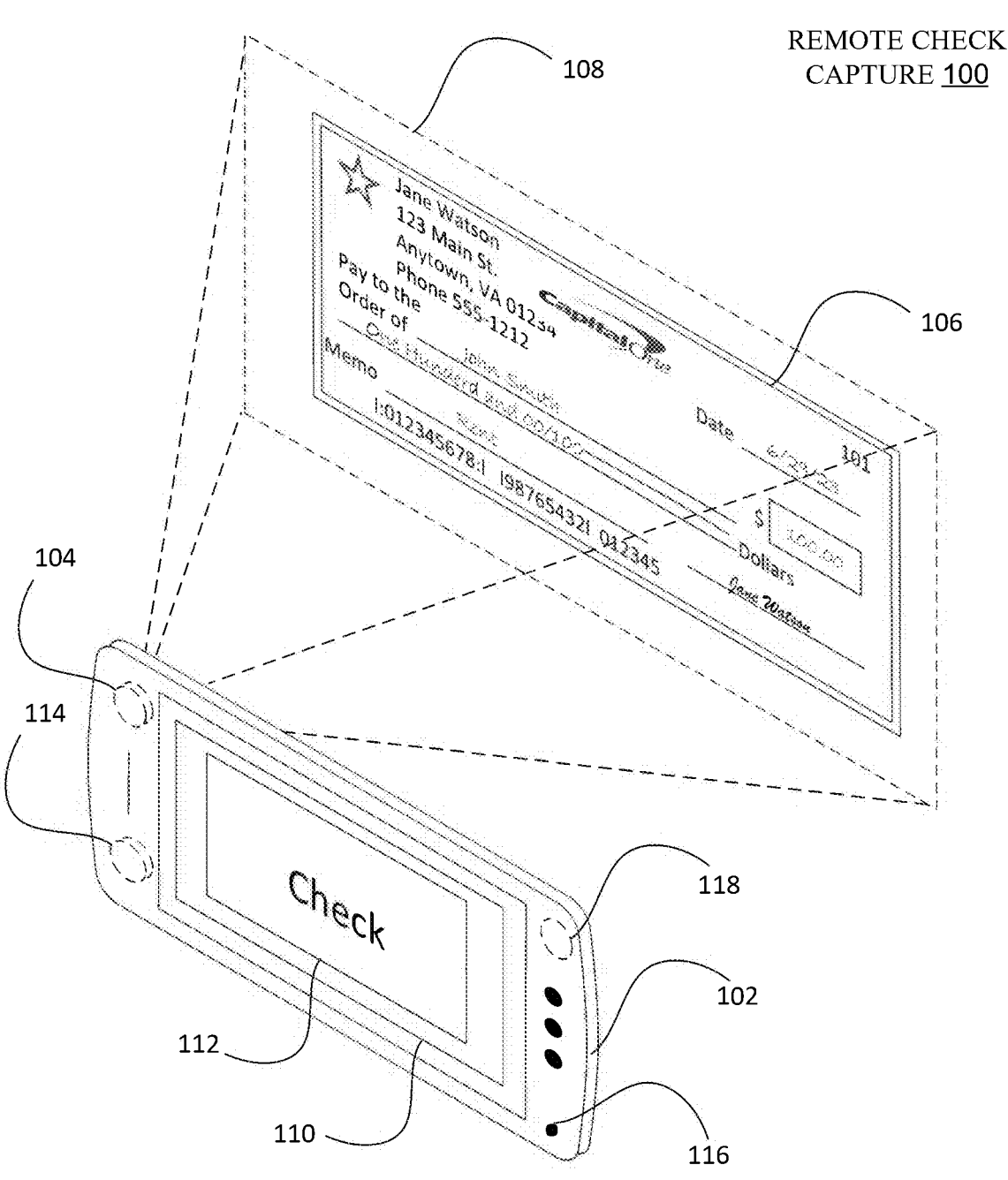
FIG. 1 illustrates an example remote deposit check process, according to some embodiments and aspects.

Disclosed herein are system, apparatus, device, method, computer program product embodiments, and/or combinations and sub-combinations thereof, for financial instrument image generation on a mobile device or desktop computing device based on LIDAR managed processes. LIDAR, an acronym of "light detection and ranging" or "laser imaging, detection, and ranging" is a method for determining distance, or ranges of distances, by targeting an object or a surface with a laser and measuring the time for reflected light to return to the receiver (e.g., light sensor). Lidar may operate in a fixed direction (e.g., vertical) or it may be scanned in multiple directions, in which case it is known as LIDAR scanning or 3D laser scanning. While described in the context of financial instrument imagery generation, the disclosed technology may be applied to any other document. The disclosed technology may be used to process images of documents during transactions, such as assisting, in real-time or near real-time, a customer to electronically deposit a financial instrument, such as a check. In some aspects, LIDAR sensors allow financial instrument image generation of paper checks, without requiring the check to be laid onto a surface. In some aspects, LIDAR sensors allow financial instrument image generation of paper checks, without requiring the user to set the check on a high contrast background surface.

In one aspect, a LIDAR based sensor resident on a client device manages image object processing sequences. For example, a user initiates a remote deposit process by opening a banking application (App) and then makes a request to deposit a check. The process, once initiated, activates a camera on the client device to begin streaming raw imagery. A LIDAR sensor may determine that a check is within a known distance or range of distances (e.g., as the camera may be moving slightly by the user). These known distances may be communicated as an input to the banking app to process instructions to select one or more camera focal distances for imagery generation. Focal distance is the distance of an image sensor from a lens when an image is focused. In some embodiments, a camera setting, such as focal distance, may be a physical setting of one or more camera lenses on the client device. In some embodiments, the focal distance may be a digital setting for the camera on the client device. In some embodiments, the focal distance may be a combination of physical and digital settings for the camera on the client device. In some embodiments, a plurality of images or portions of images may be generated by the camera at one or more of the focal settings. In some embodiments, a quality assurance process may select one or more quality images or portions of images, from a set of images, to maximize the quality. These processes may be directed by the mobile banking app, or other image processing app, and further processed by an OCR process in real-time or near real-time. While described throughout for images, the technology disclosed herein may be applied to video without departing from the scope of the technology disclosed herein.

In current remote deposit systems and processes, computer-based (e.g., laptop) or mobile-based (e.g., mobile device) technology allows a user to initiate a document uploading process for uploading an image(s) or other electronic versions of a document to a backend system (e.g., a document processing system) for various purposes, including evaluating the quality of the generated image(s). This current process has disadvantages, such as, requiring the customer to generate check imagery on a dark or high contrast surface and communicate the check imagery and, if determined to be of poor quality, following-up with additional images. This is inefficient and consumes system and network resources that otherwise could be allocated to other tasks. Alternatively, a frustrated user may take their deposit to another financial institution, causing a potential duplicate presentment or fraud issue.

The technical solution described herein improves a likelihood of processing quality imagery in poor lighting conditions, or on poor contrasting surfaces, or while being held in the air, and thus is more efficient, requires less client, system, and network resources, improves user experience, and may reduce instances of poor quality imagery. For example, current remote deposit processes may struggle with quality check image generations when the check is placed on a light (e.g., low contrast) background surface as a contrast ratio between the check surface and the background surface is not high enough to recognize the boundaries of the check. The same issues are present for a check held in the air by the user during image generation. In some embodiments, the technology described herein continuously evaluates imagery of a check/surface from an activated camera of a mobile device or other customer device. One or more recognized high quality image frames (e.g., entire image of check image), or portions thereof, may subsequently be OCR processed to extract data fields locally or, alternatively, in a remote OCR process.

Mobile check deposit is a convenient way to deposit funds using a customer's mobile device or laptop. As technology and digital money management tools continue to evolve, the process has become safer and easier. Mobile check deposit is a way to deposit a financial instrument, e.g., a paper check, through a banking app using a smartphone, tablet, laptop, etc. In existing systems, mobile deposit may request a customer to produce a plurality of pictures of a check using, for example, their smartphone or tablet camera and upload it through a mobile banking app running on the mobile device. Deposits commonly include personal, business, or government checks.

Many banks and financial institutions use advanced security features to keep an account safe from fraud during the mobile check deposit workflow. For example, security measures may include encryption and device recognition technology. In addition, remote check deposit apps typically capture check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity.

In some embodiments, the disclosed imagery generation includes live camera video of a financial instrument located within the camera field of view, allowing, for example, the user to simplify the image generation process. In one aspect, the camera imagery is streamed as encoded data configured in byte arrays (e.g., as a byte array output video stream object). This imagery may be processed continuously, or alternatively, the imagery may be stored temporarily within memory of the mobile device, such as, in a frame or video buffer.

These processes may be directed by a mobile banking app or other image processing app, and be processed by an OCR process in real-time or near real-time. The generated imagery stream may be formed into image objects and be processed by an OCR system. OCR includes the electronic or mechanical conversion of images of typed, handwritten, or printed text into machine-encoded text, whether from a scanned document, a photo of a document, a scene photo, a video stream of image data, etc. Using the technology described herein, data (e.g., check amount, signature, MICR line, account number, etc.) may be extracted in real-time or near-real-time from a live video stream of a check, or portions of the check (e.g., partial check images).

This technical solution may also eliminate requiring the customer to generate and communicate individual images, and thus is more efficient, requires less system and network resources, improves user experience, and may reduce instances of accidental duplicate check presentation. In some embodiments, the technology described herein continuously evaluates a quality of an image or video stream from an activated camera of a mobile device or other customer device. One or more high quality image frames (e.g., entire image of check image), or portions thereof, may be OCR processed to extract data fields in real-time locally or, alternatively, in a remote OCR process.

In some embodiments and aspects disclosed herein, the OCR process may be implemented with an active OCR process using a mobile device, instead of after submission of imagery to a backend remote deposit system. However, other known and future OCR applications may be substituted without departing from the scope of the technology disclosed herein.

In some aspects, the technology disclosed herein implements "Active OCR" as further described in U.S. application Ser. No. 18/503,778, entitled "Active OCR," filed Nov. 7, 2023, and incorporated by reference in its entirety. Active OCR, as further described in FIGS. 3-4, includes performing OCR processing on image objects formed from a raw live stream of image data originating from an image sensor on a client device activated camera. The image objects may include portions of a check or an entire image of the check. As a portion of a check image is formed into a byte array, it may be provided to the active OCR system to extract any data fields found within the byte array in real-time or near real-time. In a non-limiting example, if the live streamed image data contains an upper right corner of a check formed in a byte array, the byte array may be processed by the active OCR system to extract the origination date of the check.

In some embodiments, the camera continuously streams images, portions of images, or video for each side of the check data until all of the data fields have been extracted from the imagery. In some embodiments, various check framing elements, such as a border or corners, assist in alignment of continuously video streaming data fields, corresponding Byte Array Output Video stream objects, and flip detection. In some embodiments, success of the OCR extraction process may be determined based on reaching an extraction quality threshold. For example, if a trained machine learning (ML) OCR model reaches a determination of 85% surety of a correct data field extraction, then the OCR process for that field may be considered complete. Utilizing this capability, the OCR data may be communicated to a banking backend for additional remote deposit processing. Implementing the technology disclosed herein, the deposit may be processed by a mobile banking app and a remote deposit status rendered on a user interface (UI) mid-experience (for example, at or around the time that the user generates an image of the check for remote deposit). Alternatively, or in addition to, portions of the remote deposit sequence may be processed locally on the client device.

Figure 3:
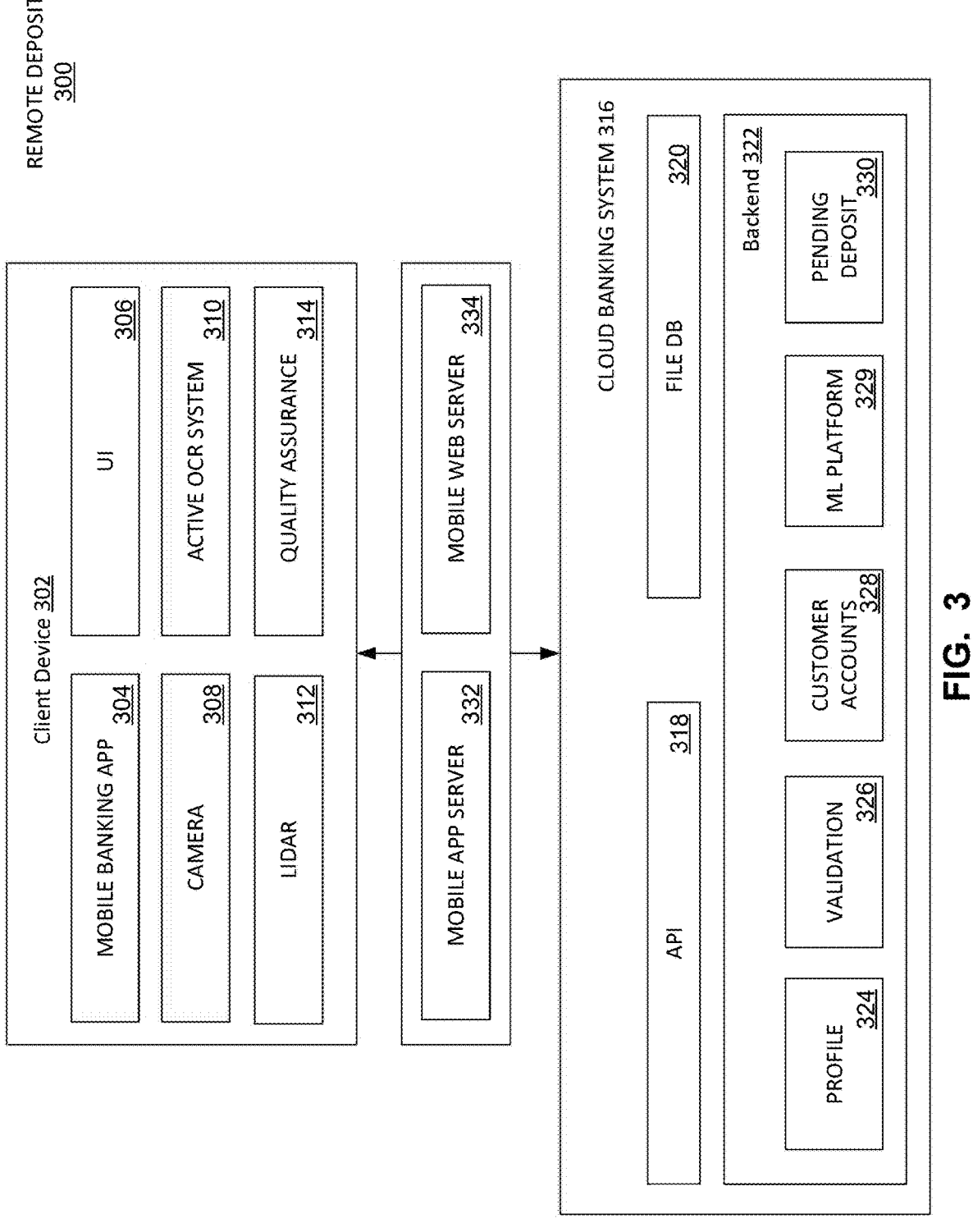
FIG. 3 illustrates a block diagram of a remote deposit system architecture, according to some embodiments and aspects.
Figure 4:
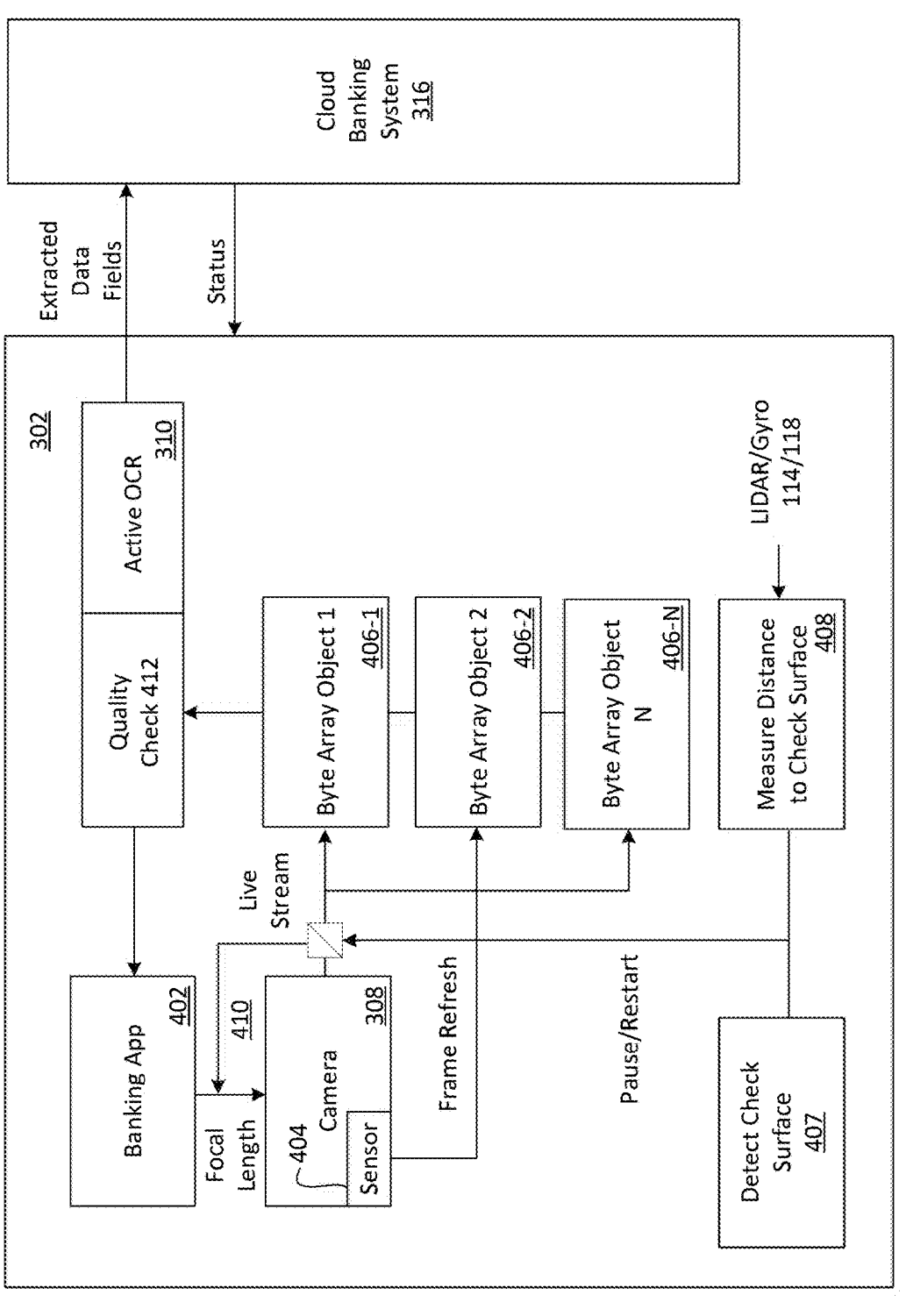
FIG. 4 illustrates a block diagram of a client device, according to some embodiments and aspects.
Figure 9:
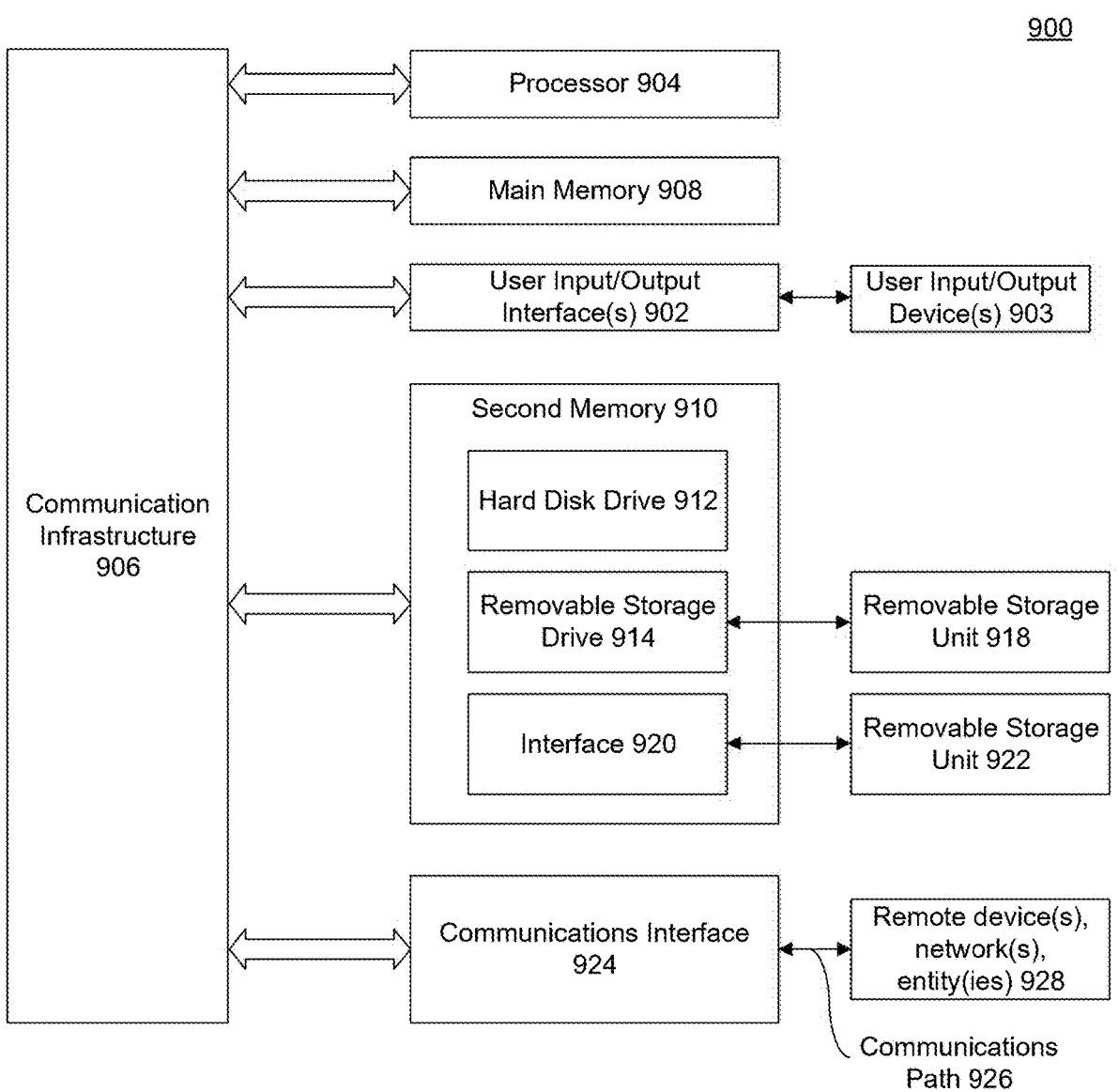
FIG. 9 illustrates an example computer system useful for implementing various embodiments and aspects.

Various aspects of this disclosure may be implemented using and/or may be part of remote deposit systems shown in FIGS. 3, 4 and 9. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit system shall now be described.

FIG. 1 illustrates an example remote check generation 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check image generation from their mobile computing device (e.g., smartphone) 102, but other digital video camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a bank account (e.g., checking or savings) into which the funds specified by the check are to be deposited. Content associated with the document include the funds or monetary amount to be deposited to the customer's account, the issuing bank, the routing number, and the account number. Content associated with the customer's account may include a risk profile associated with the account and the current balance of the account. Options associated with a remote deposit process may include continuing with the deposit process or cancelling the deposit process, thereby cancelling depositing the check amount into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104 (e.g., open a camera port). One skilled in the art would understand that variations of this approach or functionally equivalent alternative approaches may be substituted to initiate a mobile deposit.

In a mobile computing device 102 with a camera 104, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. The distance from the center of the lens to the image focal point (e.g., image sensor surface) is known as the focal length. It is typically expressed in millimeter (mm) units. A lens with a short focal length is a wide-angle lens and one with a long focal length is a telephoto lens. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination, and may have digitally adjusted focal lengths, to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In one non-limiting example, image generation, video generation, and active OCR processes may benefit from image object builds generated by one or more, or a combination of cameras or lenses. For example, multiple cameras or lenses may separately, or in combination, generate specific blocks of imagery for data fields located within a document that is present, at least in part, within the field of view of the cameras. In another example, multiple cameras or lenses may generate more light than a single camera or lens, resulting in better image quality. In another example, individual lenses, or a combination of lenses, may generate depth data for one or more objects located within a field of view of the camera.

Using the camera 104 function on the mobile computing device 102, the customer generates live imagery from a field of view 108 that includes at least a portion of one side of a check 112. Typically, the camera's field of view 108 will include at least the perimeter of the check. However, any camera position that generates in-focus imagery of the various data fields located on a check may be considered. Resolution, distance, alignment, and lighting parameters may require movement of the mobile device until a proper view of a complete check, in-focus, has occurred. In some embodiments, camera 104, LIDAR sensor 114, microphone 116, and/or gyroscope sensor 118, may generate imagery, distance, audio data, and/or angular position, respectively, to assist in detecting a distance to a surface of the check or a flipping action, as will be described in greater detail herein.

An application running on the mobile computer device may offer suggestions or technical assistance to guide a proper framing of a check within the mobile banking app's graphically displayed field of view window 110, displayed on a User Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or framing techniques are considered to be within the scope of the technology described herein. Alternatively, the camera can be remote to the mobile computing device 102. In an alternative embodiment, the remote deposit is implemented on a desktop computing device with an accompanying digital camera.

Sample customer instructions may include, but are not limited to, "Once you've completed filling out the check information and signed the back, it's time to view your check," "Make sure all four corners of the check fit within the on-screen frame to avoid any processing holdups," "Select the camera icon in your mobile app to open the camera," "Once you've generated video of the front of the check, flip the check to generate video of the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 2:
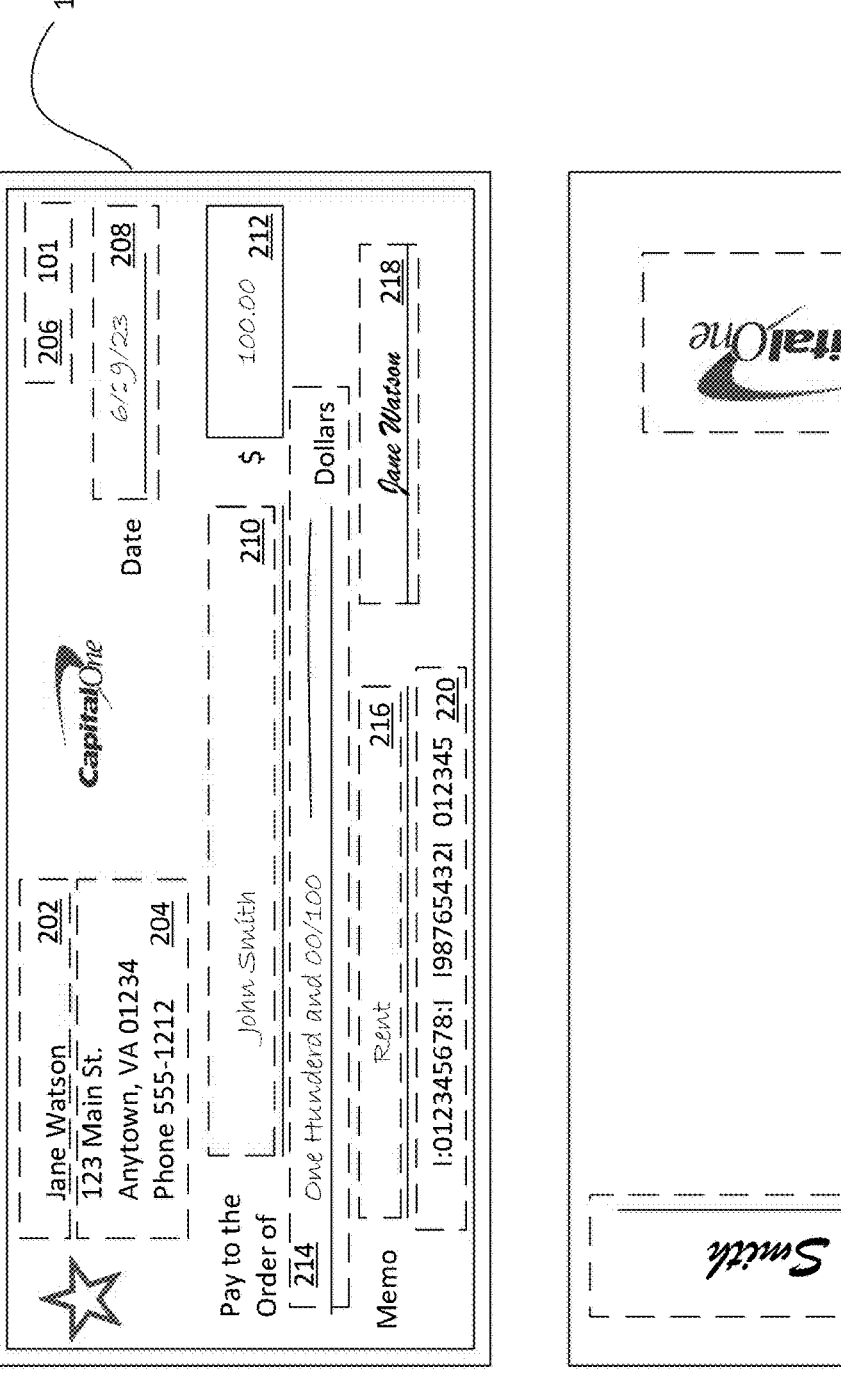
FIG. 2 illustrates example remote deposit Optical Character Recognition (OCR) segmentation, according to some embodiments and aspects.

FIG. 2 illustrates example remote deposit OCR segmentation, according to some embodiments and aspects. Depending on check type, a check may have a fixed number of identifiable fields. For example, a standard personal check may have front side fields, such as, but not limited to, a payor customer name 202 and address 204, check number 206, date 208, payee field 210, payment amount 212, a written amount 214, memo line 216, Magnetic Ink Character Recognition (MICR) line 220 that includes a string of characters including the bank routing number, the payor customer's account number, and the check number, and finally, the payor customer's signature 218. Back side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in the mobile banking app running on the mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one embodiment, active OCR processing of a live video stream of check imagery may include implementing instructions resident on the customer's mobile device to process each of the field locations on the check as they are detected or systematically (e.g., as an ordered list extracted from a byte array output video stream object). For example, in some aspects, the video streaming check imagery may reflect a pixel scan from left-to-right or from top-to-bottom with data fields identified within a frame of the check as they are streamed.

In one non-limiting example, the customer holds their smartphone over a check (or checks) to be deposited remotely while the live stream imagery may be formed into image objects, such as, byte array objects (e.g., frames or partial frames), ranked by confidence score (e.g., quality), and top confidence score byte array objects sequentially OCR processed until data from each of required data fields has been extracted as described in U.S. application Ser. No. 18/503,787, entitled Burst Image Capture, filed Nov. 7, 2023, and incorporated by reference in its entirety herein. Alternatively, the imagery may be a blend of pixel data from descending quality image objects to form a higher quality (e.g., high confidence) blended image that may be subsequently OCR processed, as per U.S. patent application Ser. No. 18/503,799, filed Nov. 7, 2023, entitled Intelligent Document Field Extraction from Multiple Image Objects, and incorporated by reference in its entirety herein.

In another non-limiting example, fields that include typed information, such as the MICR line 220, check number 206, payor customer name 202 and address 204, etc., may be OCR processed first from the byte array output video stream objects, followed by a more complex or time intensive OCR process of identifying written fields, which may include handwritten fields, such as the payee field 210, signature 218, to name a few.

In another example embodiment, artificial intelligence (AI), such as machine-learning (ML) systems may train a confidence model (e.g., quality confidence) to recognize quality of a frame or partial frame of image data, or an OCR model(s) to recognize characters, numerals or other check data within the data fields of the video streamed imagery. The confidence model and OCR model may be resident on the mobile device and may be integrated with or be separate from a banking application (app). The models may be continuously updated by future images or transactions used to train the model(s).

ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific process to generate relationships between concepts (e.g., image clarity vs. recognition of specific characters or numerals) and a success history. The classifier (discriminator) is trained to distinguish (recognize) variations. Different variations may be classified to ensure no collapse of the classifier and so that variations can be distinguished.

In some aspects, machine learning models are trained on a remote machine learning platform (e.g., see FIG. 3, element 329 and FIG. 9) using other customer's transactional information (e.g., previous remote deposit transactions). For example, large training sets of remote deposits with check imagery and corresponding camera parameters (e.g., focal length, quality, etc.) may be used to normalize prediction data (e.g., not skewed by a single or few occurrences of a data artifact). Thereafter, a predictive model(s) may classify a specific image against the trained predictive model to predict an imagery check position, distance, and quality (e.g., front-facing, flipped, back-facing, 600 mm, high quality, etc.) and generate a confidence score. In one embodiment, the predictive models are continuously updated as new remote deposit financial transactions or check imagery become available.

In some aspects, a ML engine may continuously change weighting of model inputs to increase customer interactions with the remote deposit procedures. For example, weighting of specific data fields may be continuously modified in the model to trend towards greater success, where success is recognized by correct data field extractions or by completed remote deposit transactions. Conversely, input data field weighting that lowers successful interactions may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application implementation, a mobile banking app equivalent may be configured to run on desktop computers, and web applications, which run in web browsers rather than directly on a mobile device. Apps are broadly classified into three types: native apps, hybrid and web apps. Native applications are designed specifically for a mobile operating system, such as, iOS or Android. Web apps are designed to be accessed through a browser. Hybrid apps may function like web apps disguised in a native container.

Financial instrument imagery may originate from, but is not limited to, image or video streams (e.g., series of pixels or frames). A customer using a client device 302, operating a mobile banking app 304, through an interactive UI 306, frames at least a portion of a check (e.g., identifiable fields on front or back of check) with a camera 308 (e.g., field of view).

In one aspect, the camera imagery is video streamed as encoded text, such as a byte array. Alternatively, or in addition to, the video is buffered by storing (e.g., at least temporarily) as images or frames in computer memory. For example, live video streamed check imagery from camera 308 is stored locally in image memory, such as, but not limited to, a frame buffer, a video buffer, a video streaming buffer, or a virtual buffer.

In a first non-limiting example, LIDAR sensor 312 (e.g., consistent with LIDAR sensor 114 on mobile device 102) may detect a distance from the camera on the client device to a surface of a check to be deposited. In one non-limiting example, a surface of a check may be determined by computer vision instructions executed in a client device resident graphical processor identifying any of: multiple corners, a preprinted border, a serrated edge, a data field, a contiguous check color, or a contrasting background, to name a few. Once the check surface has been identified, a distance from the check surface to the LIDAR sensor may be determined by a LIDAR transmitter impinging the check surface with one or more laser impulses and measuring the time for corresponding reflected light impulses to return to LIDAR receiver (e.g., including the LIDAR sensor 312). Based on the known speed of light and the time for a light signal to reflect back to the LIDAR sensor 312, a distance may be calculated. Alternatively, a range of distances may be determined by targeting the check surface with a plurality of laser impulses and measuring the times for the respective reflected light signals to return to the receiver. In some aspects, as a mobile device may not be held perpendicular to a surface, a gyroscope sensor 118 may account for, or alternatively, correct for measurements made at an angle to a surface using known geometric principles. In some aspects, an animation (e.g., augmented reality), rendered on UI 306, may assist a customer to determine or correct for out of level or angular positions of the client device during image generation.

In some aspects, based on the calculated distance, a camera focal length is selected to provide focused imagery of the check surface to the camera image sensor (e.g., FIG. 4, 404). In some embodiments, based on the calculated distance or range of distances, a plurality of focal lengths are selected to provide a plurality of images "in-focus" to the camera image sensor (e.g., FIG. 4, 404). A quality assurance process 314 may be implemented to select a high quality (in-focus) image or portion of an image from the plurality of images. In some aspects, one or more images are captured automatically at the plurality of selected focal lengths.

In one quality assurance method, by first detecting pixels in an image or video stream, or image byte array, that contains typed or written image components, with, for example, darker, higher contrast, and common black or blue color values, a confidence score may be calculated based on an overall perceived individual image quality. In some aspects, the confidence score may be predicted by a ML model trained on previous images, assigned confidence scores, and corresponding quality ratings. Alternatively, or in addition to, in one aspect, a total pixel score for each image or image portion may be calculated. For example, in some aspects, only pixels in a range of pixel values (e.g., range of known marking pixel values, such as 0-50) may be processed, without processing the remaining pixels. For example, those pixels that only include a high pixel value (e.g., lighter pixel grey values), such as, in a background section of the check may not be included in a generated confidence score. In some aspects, pixels that include preprinted border pixels also may not be considered in the confidence score. In this aspect, the previously discussed ML models may be trained to recognize the values that represent the written or typed information as well as the preprinted borders. For example, using machine learning, thousands or millions of images may be processed to learn to accurately recognize and categorize these pixels.

In some embodiments, active OCR system 310, resident on the client device 302, processes the highest confidence images based on live video streamed check imagery from camera 308 to extract data by identifying specific data located within known sections of the check to be electronically deposited. In one non-limiting example, single identifiable fields, such as the payor customer name 202, MICR data field 220 identifying customer and bank information (e.g., bank name, bank routing number, customer account number, and check number), date field 208, check amount 212 and written amount 214, and authentication (e.g., payee signature 222) and security fields 224 (e.g., watermark), etc., shown in FIG. 2, are processed by the active OCR system 310 by OCR processing one or more blocks or arrays of image data.

Active OCR system 310 communicates data extracted from the one or more data fields during the active OCR operation to cloud banking system 316, shown in FIG. 3. For example, the extracted data identified within these fields is communicated to file database (DB) 320, either through a mobile app server 332, or mobile web server 334 depending on the configuration of the client device (e.g., mobile or desktop). In one aspect, the extracted data identified within these fields is communicated through the mobile banking app 304.

Alternatively, or in addition to, a thin client (not shown) resident on the client device 302 processes extracted fields locally with assistance from cloud banking system 316. For example, a processor (e.g., CPU) implements at least a portion of remote deposit functionality using resources stored on a remote server instead of a localized memory. The thin client connects remotely to the server-based computing environment (e.g., cloud banking system 316) where applications, sensitive data, and memory may be stored.

In one embodiment, imagery with a highest confidence score is processed from individual images, portions of images, or live video stream check imagery from camera 308, as communicated from an activated camera over a period of time, until an active OCR operation has been completed. For example, a highest confidence scored image in a plurality of images, or partial images, is processed by active OCR system 310 to identify as many data fields as possible. Subsequently, the next highest confidence scored image is processed by active OCR system 310 to extract any data fields missing from the first image OCR and so on until all data fields from the check have been generated. Alternatively, or in addition to, specific required data fields (e.g., amount, MICR, etc.) may be identified first in a first OCR of a highest confidence scored image or partial image, followed by subsequent data fields (e.g., signature) in lower confidence scored mages.

In one embodiment, a flip detector detects a check position sequence of front facing, flip, and back facing. As described in greater detail in FIG. 6, various mechanisms may detect this sequence based on any of, or a combination of, position, vision, sound, or multiple document analytics.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a server, such as a mobile edge server (not shown), within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316 or third party systems or data.

Customer Accounts 328 includes, but is not limited to, a customer's banking information, such as individual, joint, or commercial account information, balances, loans, credit cards, account historical data, etc.

Figure 8:
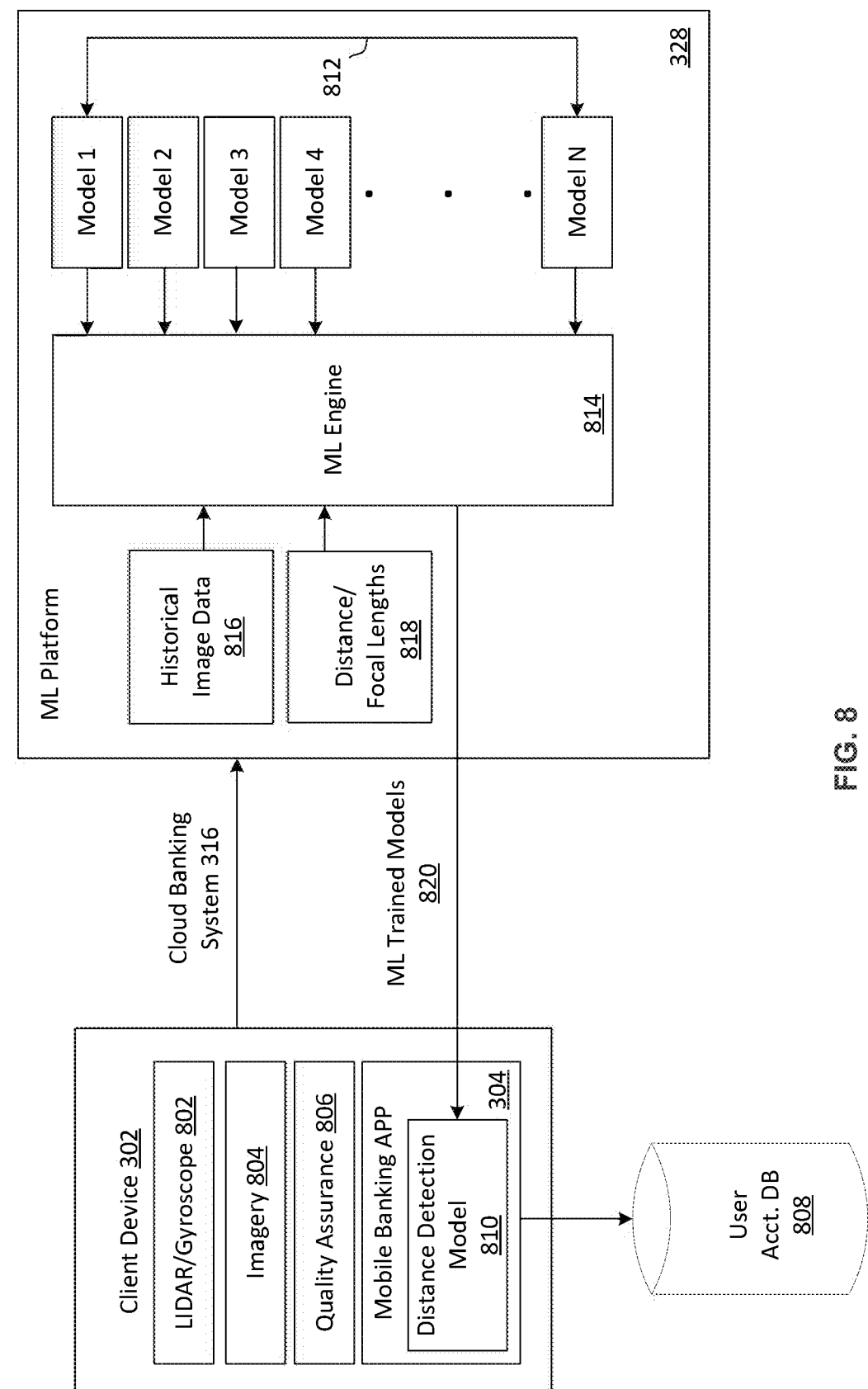
FIG. 8 illustrates a block diagram of a ML system, according to some embodiments and aspects.

ML Platform 329 may generate a LIDAR distance measurement model, quality confidence model, and/or OCR model (e.g., active OCR 310) using a ML engine. This disclosure is not intended to limit the ML Platform 329 to only LIDAR distance, quality confidence, active OCR, or OCR model generation, as it may also include, but not be limited to, remote deposit models, risk models, funding models, security models, etc. FIG. 8 provides additional ML detail.

When remote deposit status information is generated, it is passed back to the client device 302 through API 318 where it is formatted for communication and display on the client device 302 and may, for example, communicate a funds availability schedule for display or rendering on the customer's device through the mobile banking app UI 306. The UI may instantiate the funds availability schedule as images, graphics, audio, additional content, etc.

Pending deposit 330 includes a profile of a potential upcoming deposit(s) based on an acceptance by the customer through UI 306 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 302, third party platforms, the cloud banking system 316, or distributed across multiple computer-based systems. The UI may instantiate the remote deposit status as images, graphics, audio, additional content, etc. In one technical improvement over current processing systems, the remote deposit status is provided mid-video stream, prior to completion of the deposit. In this approach, the customer may terminate the process prior to completion if they are dissatisfied with the remote deposit status.

In one aspect embodiment, remote deposit system 300 tracks successful OCR data field extractions. For example, did the system collect the data fields needed to complete a remote deposit operation, or was additional imagery needed, or did it cancel the request? In some aspects, the completion of the remote deposit operation reflects a successful outcome, while a cancellation reflects a failed outcome. In some aspects, a customer's behavior, not limited to success/failure, may be fed back to the ML platform 329 to enhance future training of any of the ML models disclosed herein. For example, in some embodiments, one or more inputs to the ML models may be weighted differently (higher or lower) to effect a predicted higher successful outcome.

FIG. 4 illustrates an example diagram of a client device 302, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In one embodiment, banking app 402 is opened on the client device 302 and the deposit check function selected to initiate a remote deposit process. A camera 308 is activated to initiate a live stream of imagery from a field of view of the camera 308. The camera may output, for display on user interface (UI) 306 (shown in FIG. 3), one or more images, portions of images, or video frames having one or more images (e.g., images of real-world objects) that are viewable by camera 308. A video frame may include one or more real-world objects. For instance, a video frame may represent an entire group of checks within a field of view of camera 308, or may represent one or more individual objects within the group. In one aspect, the image, image portion, video frame, or partial video frame of decodable check indicia may be provided by a raw video stream, byte array object(s), as a compressed video stream or byte array, and/or a partially compressed video stream or byte array.

The raw image stream may be detected by a camera image sensor 404 (such as a complementary metal-oxide-semiconductor (CMOS) image sensor or a charge-coupled device (CCD). In CCDs, there is a photoactive region (an epitaxial layer of silicon), and a transmission region made out of a shift register. An image is first projected through a lens onto the photoactive region of the CCD, causing each capacitor of a capacitor array to accumulate an electric charge proportional to the light intensity at that location. A one-dimensional array, used in line-scan cameras, generates a single slice of the image, whereas a two-dimensional array, used in video and still cameras, generates a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire contents of the array in the semiconductor to a sequence of voltages. These voltages are then sampled, digitized, and may be stored in computer memory within client device 302, such as image memory.

While described herein as a post camera activated process, the LIDAR measurement, focal length selections, and quality assurance processes described hereafter may be implemented before or after camera activation without departing from the scope of the technology described herein.

A distance 408 from the check surface to the LIDAR sensor 114 (as shown in FIG. 1) may be determined by targeting the check surface with a one or more laser impulses and measuring the time for the reflected light to return to the receiver. Based on a transmission timestamp, the speed of light, and the time for a light signal to reflect back to the LIDAR sensor 114, a distance may be calculated. Alternatively, a range of distances may be determined by targeting the check surface with a plurality of laser impulses and measuring the times for the respective reflected light signals to return to the sensor. In the various embodiments and aspects disclosed herein, the LIDAR functionality is built-in to the client device 302. In some aspects, as a mobile device may not be held perpendicular to a surface, a gyroscope sensor 118 (as shown in FIG. 1) may account for, or alternatively, correct for measurements made at an angle to a surface using known geometric principles. For example, gyroscope data may assist LIDAR functionality by providing angular measurements other than distance. In this aspect, distance is combined with angular position of the client device 302 to provide enhanced accuracy with respect to the relationship of the client device 302 to the check 108 and/or the surface that it rests on.

In some embodiments, based on the detection of the check surface 407 and the calculated distance 408, a focal length 410 camera adjustment is selected to provide focused imagery of the check surface to the camera image sensor 404. In some embodiments, based on the calculated distance or range of distances, a plurality of focal lengths are selected to provide a plurality of images "in-focus" to the camera image sensor 404. In a scenario where a plurality of images are generated at a plurality of focal lengths, a quality assurance process may be implemented to select a high quality (in-focus) image or portion of an image from the plurality of images.

In one quality check 412 method, by first detecting pixels in a video stream, or image byte array, that contain typed or written image components, with, for example, darker, higher contrast, and common black or blue color values, a confidence score may be calculated based on an overall perceived individual image quality. In some aspects, the confidence score may be predicted by an ML model trained on previous images, assigned confidence scores, and corresponding quality ratings. Alternatively, or in addition to, in one aspect, a total pixel score for each image or image portion may be calculated. For example, in some aspects, only pixels in a range of pixel values (e.g., range of known marking pixel values, such as 0-50) may be processed, without processing the remaining pixels. For example, those pixels that only include a high pixel value (e.g., lighter pixel grey values), such as, in a background section of the check may not be included in a generated confidence score. In some aspects, pixels that include preprinted border pixels also may not be considered in the confidence score. In this aspect, the previously discussed ML models may be trained to recognize the values that represent the written or typed information as well as the preprinted borders. For example, using machine learning, thousands or millions of images may be processed to learn to accurately recognize and categorize these pixels.

In a non-limiting example, the live image stream may be assembled into one or more byte array objects 406 (1-N), such as frames, or partial frames, of image content. In one aspect, a data signal from camera image sensor 404 (e.g., CMOS or CCD) on camera 308 notifies the banking app when an entire image sensor has been read out as a frame of video. In this approach, the camera image sensor 404 is cleared of electrons before a subsequent exposure to light and a next frame of an image generated. This clearing function or frame refresh may be conveyed to the banking app 402, or the active OCR system 310, to indicate that the byte array object constitutes a complete frame of video data. In some aspects, the images from the raw video stream that are formed into byte array objects may be first rectified to correct for distortions based on an angle of incidence, may be rotated to align the imagery, may be filtered to remove obstructions or reflections, and may be resized to correct for size distortions, using known image processing techniques. In one aspect, these corrections may be based on recognition of corners or borders of the check as a basis for image orientation and size, as is known in the art.

In one non-limiting example, a series of byte array objects 406 (1-N) are initially formed as sequential sensor frame refresh signals are received. In some aspects, a flip detector (not shown) detects a flip action, during a flip sequence of front facing, flip, back facing, a pause signal stops the forming of byte array objects until the flip sequence is completed, where a restart signal continues the forming of byte array objects.

While any portion of a byte array may be OCR processed during data field extractions, in some embodiments, a byte array object 406 (1-N) of an entire frame, or multiple frames, may be OCR processed sequentially until all data fields have been extracted. For example, multiple images or multiple image portions may be processed to collectively overcome low quality images, such as, but not limited to those images that are missing pixels, that include shadowing, that are taken from sharp angles, or that are off-centered, to name a few. In a non-limiting example, a first image may have a right corner missing. A second image may be subsequently OCR processed to extract any data fields that may be located in the missing corner. The technology described herein extracts as many fields from a byte array object, including a frame, or at least a portion of a frame, and continues the extraction process, processing as many images or image portions, until all data fields have been extracted. Continuing from the above example, if only a lower right corner of an image is missing, a byte array substantially formed from pixels originating from the lower right corner of the check image may be OCR processed to extract the missing data field(s) using any of the techniques disclosed herein. Corner and position designations may be generated based on the recognition of check border or edges.

This extracted data may be continuously transmitted, periodically transmitted, or be transmitted after completion of the active OCR process (e.g., after all data fields are extracted), as check data fields to a cloud banking system 316 via a network connection. A status of the remote deposit process may be communicated to the client device, and may be displayed to the user on the UI 306.

In one aspect, imagery of a first side is processed, followed by a flip and then processing of second side imagery. Alternatively, or in combination, the first side and second side imagery is processed together or in parallel using the byte array objects formed before and after the flip action.

In some embodiments, a cloud banking system 316, as previously described in FIG. 3, may be used to assist implementation of the localized client device 302 OCR processing, or active OCR 310 processing. In a non-limiting example, computer vision algorithms for OCR processing may use large language models (LLM). A large language model is a language model characterized by emergent properties enabled by its large size. As language models, they work by taking an input text and repeatedly predicting the next token or word. They may be built with artificial neural networks, pre-trained using self-supervised learning and semi-supervised learning, typically containing tens of millions to billions of weights. In some aspects, LLM includes Natural Language Processing (NLP). One goal is a computer capable of "understanding" the contents of images, including the contextual nuances of the language within them. The technology can then accurately extract information and insights contained in the images as well as categorize and organize the images or fields within images themselves. LLM and NLP functionality may be implemented on the cloud banking system 316 to train and improve the previously described ML OCR models that may be operative with the mobile device for the localized active OCR processing.

The technical solution disclosed above allows high quality image, image portions, or video generation of both sides of the financial document (e.g., check). This solution improves the quality of the check remote deposit process, accelerates the remote check deposit process, and allows mid-video stream alterations or improvements, for example, real-time image quality guidance or customer inputs (e.g., mid-video stream cancelation), as well as the other technical advantages described throughout this disclosure.

Figure 5:
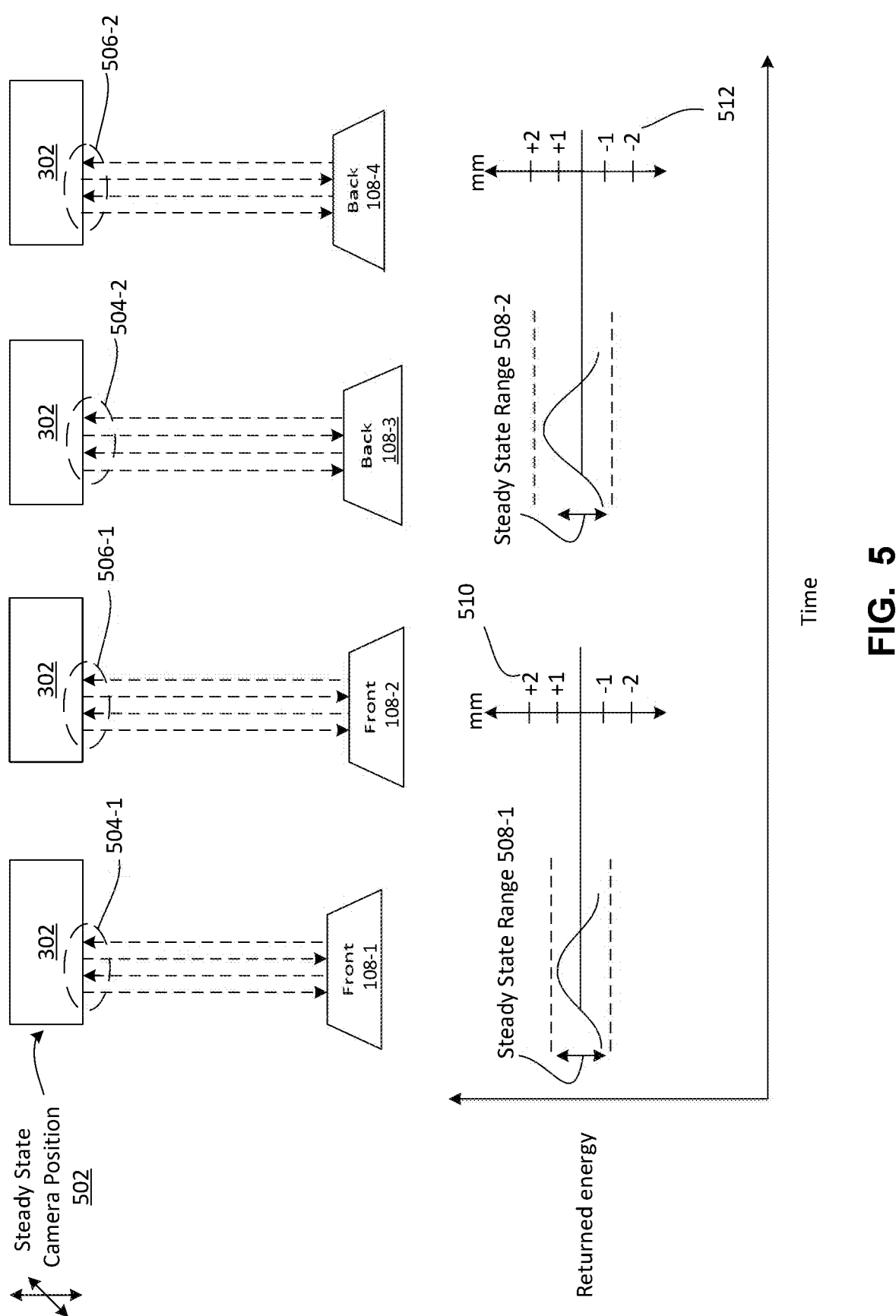
FIG. 5 illustrates Light Detection and Ranging (LIDAR) managed imagery generation, according to some embodiments and aspects.

FIG. 5 illustrates LIDAR managed imagery generation, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

In a first aspect, a client device 302 steady state camera position analysis module 502 may continuously monitor the check surface distance during imagery generation. Steady state camera position analysis module 502 may include the LIDAR sensor 114 and implement instructions to perform a distance-based analysis. For example, LIDAR sensor 114 may determine that a check 108 (shown at positions 108-1, 108-2, 108-3 and 108-4) is within a known distance or distance range (steady state ranges 508-1 or 508-2) for proper imaging (e.g., in focus) and is not moving (e.g., constant distance or low rate of distance changes) or, conversely, is moving (e.g., no longer constant or is incurring a high rate of distance changes) during a flip sequence. The LIDAR measurements 504-1 and 504-2 may include one or more light impulse transmissions to the check surface and corresponding returned light impulses to account for some minor fluctuations as the user moves the client device within a steady state camera position during video generation. The camera movement may be within a range of distances orthogonal to the check and/or within an angular range of motion. The steady state range accounts for these camera movement induced fluctuations. In a non-limiting example, these steady state fluctuations may be characterized based on a signal-based envelope detector. An envelope detector (sometimes called a peak detector) may be an electronic circuit that takes a (relatively) high-frequency amplitude modulated signal (e.g., generated by continuous small movements of the camera) as an input and provides an output, which is the demodulated envelope of the original signal. Therefore, the envelope detector generates a smoothed signal (e.g., 508-1) from a waveform of slight measurement signal variations of moving the client device 302 within an expected range of movements during video generation. A similar waveform 508-2 may be generated within the steady state range (e.g., represented by a larger distance range), when the check is in the back facing 108-3 position lying on a substantially flat surface and in a motionless state. A LIDAR flip approach is described in greater detail in FIG. 6.

Alternatively, or in addition to, steady state camera position analysis module 502 may include gyroscopic components resident on the client device. A gyroscope 118 is a device used for measuring or maintaining orientation and angular velocity or position. In a non-limiting example, it may be implemented with a (micro-electromechanical system) MEMS system that can range from several millimeters to less than one micrometer. For example, gyroscope 118 supports confirming a positioning of the client device 302 in relationship to the check or supporting surface. The gyroscope provides a technical solution to distinguish whether the client device is moving or the check is moving (e.g., being flipped). In a non-limiting example, the gyroscope confirms that the client device 302 is not being moved erratically (e.g., within a steady state range 508-1 or 508-2), based on the gyroscopic data. For example, if the user drops the client device during video generation, it may be improperly defined as a change in distance and the bank app or image processor may attempt to improperly adjust the focal length. Therefore, the gyroscope 118 establishes relative positioning. In some aspects, movement of the client device 302, as detected by the LIDAR and/or gyroscope, may be used to calibrate the steady state range. For example, during a camera calibration phase, it is determined that the user normally moves the client device 302 between 50-100 mm and rotates it between 5 and 10 degrees as it generates imagery. These ranges 510 and 512 are exemplary and other ranges are within the scope of this disclosure.

In some embodiments, based on the calculated distance 504-1 or 504-2, a focal length 410 is selected to provide focused imagery 506-1 (shown as multiple images) of the check surface to the camera image sensor (e.g., FIG. 4, 404). In some embodiments, based on the calculated distance or range of distances, a plurality of focal lengths are selected to provide imagery "in-focus" at respective example distances 506-1 and 506-2 to the camera image sensor (e.g., FIG. 4, 404). In a scenario where a plurality of images are generated at a plurality of focal lengths, a quality assurance process 314 may be implemented to select a high quality (in-focus) image or portion of an image from the plurality of images.

In a second aspect, steady state camera position analysis module 502 may monitor a check position during a video generation. For example, an image processing system resident on client device 302, may determine an orientation of the check and establish the front facing position 108-1 or 108-2 by following changes to the original orientation of the check in the video as the check is flipped to back facing positions 108-3 or 108-4. Alternatively, or in addition to, a vision analysis module, not shown, may determine a check position during a video generation by recognizing a sequence, such as, in-focus, out-of-focus, in-focus, as may be found in a check flipping sequence. In some aspects, the image processing system can use computer vision algorithms to recognize a portion of the check, such as border, frame around the check, or a known data field (e.g., check number) and recognize its position on a check surface or its movement through the check flip sequence using object or motion recognition techniques. In one aspect, an image shape of the check may appear rectangular, or have a rhomboidal shape when captured at an angle. While described for a few vision analysis examples, this disclosure is not to be limited thereto, as other image processing approaches may be substituted for the examples provided herein.

In one aspect, a multiple document analysis module, not shown, may monitor for a presence of multiple checks during imagery generation. For example, an image processing system, resident on client device 302, may determine that more than one check is present in a field of view 108 of the camera (e.g., while the client device 302 is still or as it scans a group of multiple checks). In a first aspect, single checks are processed sequentially using the methods described herein. In a second aspect, each of the checks are processed in parallel for each of the front facing positions, all checks are then flipped, and then the back facing positions are generated for the multiple checks present. In a hybrid model, each of the checks may be processed individually with a plurality processed in parallel. For example, a user may group the checks in rows and process the complete rows in parallel, with any extra checks not in rows (e.g., an odd number) processed individually. In one non-limiting aspect, a ML model is trained on hundreds or thousands of multiple check remote deposit transactions with different numbers of checks, sizes, or types to generate a multiple check model that may predict that multiple checks are being generated by the video. In one aspect, the individual check positions may be provided to the mobile banking app to coordinate generation of front and back facing imagery for each individual check in the multiple check group.

Figure 6:
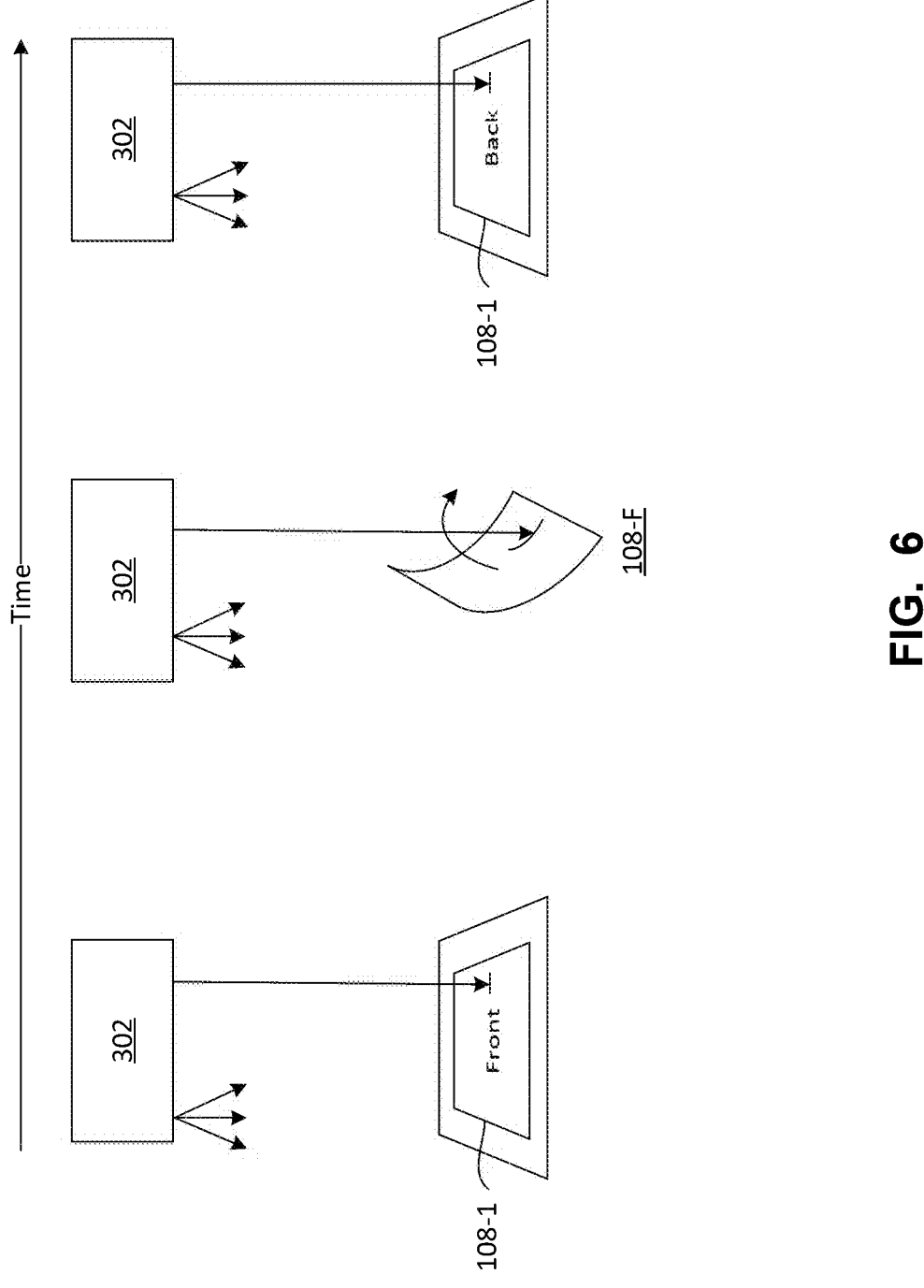
FIG. 6 illustrates LIDAR managed imagery generation, according to some embodiments and aspects.

FIG. 6 illustrates LIDAR managed imagery generation, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

In some embodiments disclosed herein, LIDAR sensor 114, resident on a client device 302, manages image object sequences. For example, the customer initiates a remote deposit process by opening an application (App) and then making a request to deposit a check. The process, once initiated, activates a camera on the client device to begin generating imagery. As described in FIG. 5, the LIDAR sensor 114 is activated to monitor for a steady state range of the camera to check distance and adjust the focal length.

In a front facing position 108-1, the client device forms image objects (e.g., frames) from the live image stream for active OCR processing. The LIDAR sensor 114 monitors for a flipping of the check 108-F to distinguish between first-side and second-side video images. Flipping of the check will cause LIDAR measured distances to fluctuate from a steady state range 504-1 or 504-2 of measurements 510 or 512 based on a check lying on a substantially flat surface and in a motionless state.

However, as the check is flipped 108-F, reflections from the check and the user's arm, hand(s) or fingers/hand will cause a sequence of rapid reflected light changes indicating distances outside of the steady state range of measurements (e.g., exceeds a threshold distance or rate of change). While shown as a smooth waveform in FIG. 5 for diagrammatic purposes, the waveform in practice may be a highly fluctuating signal and include noise contributions from reflections of the user's arm, hands, fingers, or other objects (e.g., watch, clothing, pen in hand, etc.). In one aspect, an amplitude detector may analyze the signal changes outside of the steady state range and determine that a flip is occurring based on exceeding a threshold amplitude.

The LIDAR sensor 114, in some aspects, will cause image object building to pause during the detected flipping action and restart the image object building after flip completion. Therefore, implementing the technology disclosed herein, at least a portion of a remote deposit process will be locally processed to generate imagery and flip detection. These processes may be directed by a mobile banking app or other image processing app and imagery generated in real-time or near real-time. In a preliminary step, to more efficiently detect check positions, a perimeter and orientation of the check is first determined using check orientation and position algorithms.

Figure 7:
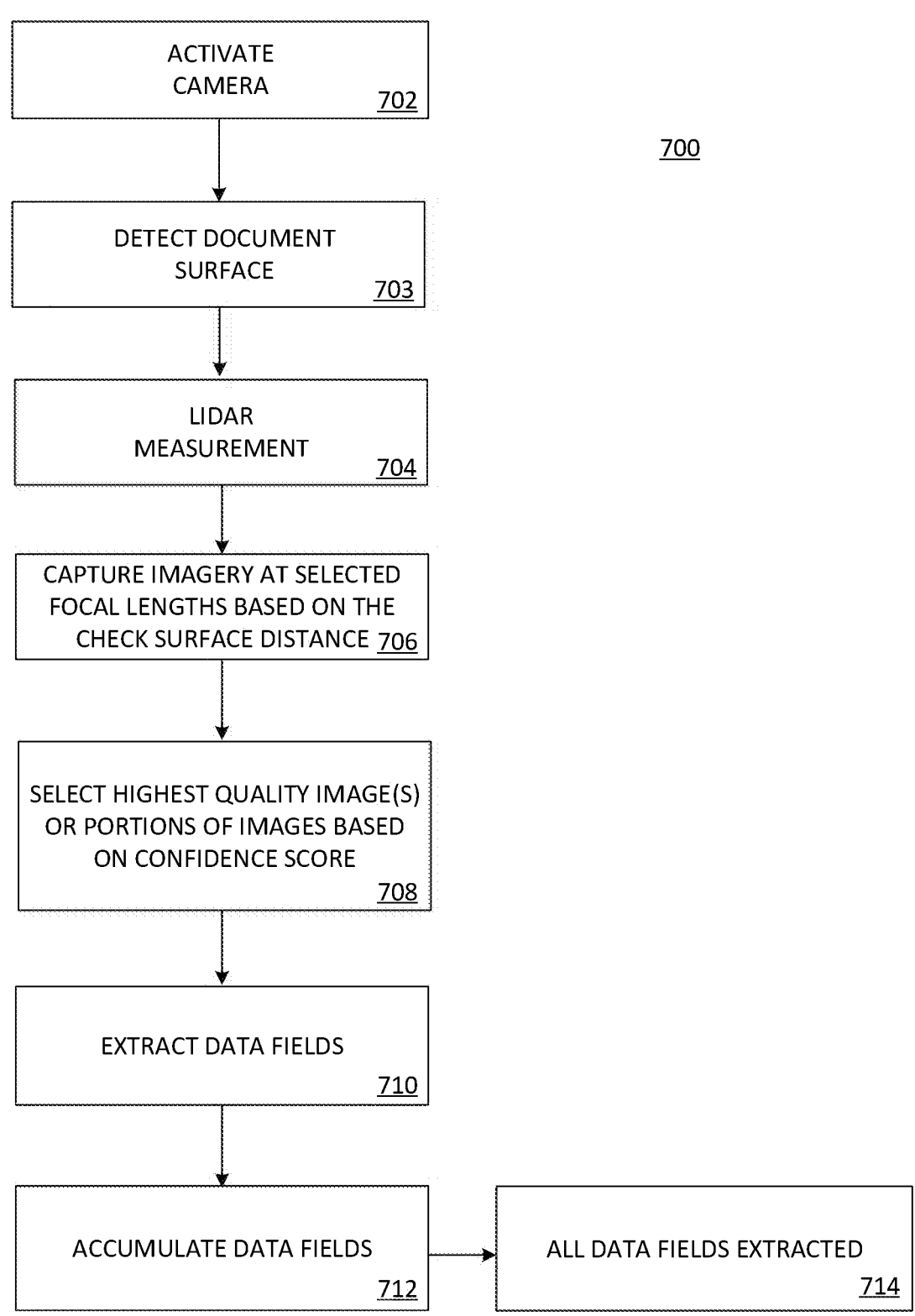
FIG. 7 illustrates a flow diagram for a remote deposit system, according to embodiments and aspects.

FIG. 7 is a flow chart 700 depicting LIDAR-assisted image capture and data extraction that can be carried out in line with the discussion above. One or more of the operations in the method depicted by FIG. 7 may be carried out by one or more entities, including, without limitation, client device 302, cloud banking system 316, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described instantiate an active OCR process for a ranked sequence of confidence scored images in a remote deposit environment.

In 702, a mobile banking app 304 initiates a remote deposit by activating a client device 302 camera 308. For example, a customer using a mobile computing device, operating a mobile banking app, initiates a remote deposit by selecting this option on a UI of the banking mobile app on their mobile computing device. This selection provides instructions to the camera to communicate image data from the field of view of the camera as a raw live stream of image data 1, 2, 3 . . . X, where X is a number of pixels of image data.

In 703, a surface of a check is detected. For example, using computer vision techniques, multiple corners, a pre-printed border, a serrated edge, a data field, a contiguous check color, or a contrasting background vision are detected to differentiate the check surface from one or more background surfaces.

In 704, LIDAR sensor 114 may detect a distance from the camera on the client device to a surface of a check to be deposited. A distance from the check surface to the LIDAR sensor may be determined by a LIDAR transmitter imping-ing the check surface with one or more laser impulses and measuring the time for corresponding reflected light impulses to return to LIDAR receiver (e.g., including the LIDAR sensor 312). Based on the known speed of light and the time for a light signal to reflect back to the LIDAR sensor 312, a distance may be calculated. Alternatively, a range of distances may be determined by targeting the check surface with a plurality of laser impulses and measuring the times for the respective reflected light signals to return to the receiver. In some aspects, as a mobile device may not be held perpendicular to a surface, a gyroscope sensor 118 may account for, or alternatively, correct for measurements made at an angle to a surface using known geometric principles. In some aspects, an animation (e.g., augmented reality), rendered on UI 306, may assist a customer to determine or correct for out of level or angular positions of the client device during image generation.

In 706, in some aspects, based on the calculated distance, a focal length is selected to provide focused imagery of the check surface to the camera image sensor (e.g., FIG. 4, 404). In some embodiments, based on the calculated distance or range of distances, a plurality of focal lengths are selected to provide a plurality of images "in-focus" to the camera image sensor.

In 708, a quality assurance process 314 may be imple-mented to select a high quality (in-focus) image or portion of an image from the plurality of images.

In 710, a live image stream, for example, pixels 1, 2, 3 . . . X, is converted to byte array objects, consistent with previously described byte array objects 406 (1-N). In one aspect, a raw live image stream may be continuously formed into byte array objects until an active OCR process has extracted selected data fields from a first side of the check. Alternatively, raw live image stream may be continu-ously formed into byte array objects until an active OCR process has extracted all data fields from the imagery of both sides of the check. Alternatively, or in addition to, segments or blocks within known data field areas on the check may be processed to determine an initial check orientation and determine a side facing the camera of the client device 302. For example, if the check number data field is recognized by the active OCR 310, it may be determined that the front side of the check is facing up, where a security watermark or signature line may be indicative of a back-side facing. Using supervised learning, thousands or millions of images may be processed to learn to recognize a check type and common data fields and their locations relative to a border or side of a check. Alternatively, or in addition to, the two methods described above may be combined.

In 712, the active OCR 310 processes the first and second side formed byte array objects to accumulate a target set of data fields (e.g., as shown in FIG. 2). In each OCR process, a maximum number of data fields may be extracted from each of the byte array objects until all data fields of the target set of data fields have been extracted 714. The number of byte array objects formed may be hundreds or even thou-sands of byte array objects until all desired data fields have been extracted. In addition, the byte array objects may include a full frame of data or be any portion of an image formed from the raw live image stream. For example, as an upper corner of an image is being formed into a byte array and the active OCR system 310, in real-time, extracts any data fields located in this portion of the image. In a non-limiting example, as the customer moves their client device 302 around (e.g., standing over the check with at least a portion of the check in the field of view), a live image stream is being generated based on the continuous LIDAR mea-surements, focal length adjustments and quality assurance processes as described throughout. This approach provides a technical solution to effectively extract data fields from check imagery. For example, a user may move the client device around freely as the camera generates a live video stream of potentially good (in-focus, good lighting, low shading, etc.) and bad quality imagery (e.g., shadows, glare, or off-center) without requiring the user to take a picture or communicate pictures to a remote OCR system, thus allow-ing for real-time extraction of the check data fields. In addition, an addition technical advantage is achieved by pausing forming byte arrays or active OCR of imagery that is generated during the flip action. This pause reduces errors during the flip as well as efficiently allocating limited client device resources.

While described throughout for active OCR processing, in some aspects, the OCR process may be any process that can extract data fields from the formed byte array objects, including remote systems and processes.

FIG. 8 illustrates a block diagram of a ML system, according to some embodiments and aspects. A LIDAR measurement and focal distance selection or adjustment implementation may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 9, as will be understood by a person of ordinary skill in the art.

In some aspects, a Distance Detection Model 810 may be processed locally on the client device 302 to improve check data field extraction performance, such as accuracy, quality and speed, to name a few. In various aspects, Distance Detection Model 810 may be a standalone model or be integrated within mobile banking app 304 (as shown), or within active OCR system 310. ML models (1-N) 812 may singularly, or collectively, implement any of, but are not limited to, a ML predictive model focal distance selection based on LIDAR distance measurement(s), a ML model to process the LIDAR measured distance based on camera orientation relative to the check surface, a ML model for image quality scoring, a ML predictive model for flip detection, a ML model for selecting an optimum number of quality scored byte array objects, a ML model for communicating the selected byte array objects to an OCR process, and a ML model for determining when a target set of desired check data fields have been extracted.

In some aspects, LIDAR/gyroscope 802 measurement data may be used by the ML platform to train a ML model 812 that may be implemented by the steady state camera position analysis module 502 to predict check distance, steady state range, orientation, or flipping actions. In some aspects, imagery 804 (e.g., byte array objects) may be used by the ML platform to train a ML model 812 for a vision analysis to predict check orientation and flipping. In some aspects, Quality Assurance ML model 806 may be used by the ML platform to train a ML model 812 for a Quality Assurance 314 or check 412 to predict check image quality.

Training of any of the described ML models may occur remotely from the client device 302 (e.g., in ML platform 329) and be communicated to the client device 302 as one or more ML model(s) 812 are trained and updated. Training may include exposing the ML models to the data of hundreds, thousands, or more of historical images 816, where specific flip sequences and success of subsequent data field extractions may be included in a supervised model build. Image quality thresholds may be selectable and varied during the training process to generate an optimized quality threshold based on a historical correlation with active OCR extracted data fields. Trained ML models 820 may each have varied metadata weightings, performance weightings, or quality weightings, but are not limited to these parameter weightings. One skilled in ML would appreciate that any of the parameters used in the active OCR extraction process, such as, but not limited to, image quality or performance targets may have weighting varied without departing from the scope of the technology disclosed herein.

Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a high quality image may be correlated with a confidence score based on previously assigned quality ratings of a number of images. This may then be used as training data for the computer to improve the algorithm(s) it uses to determine future successful outcomes.

The trained ML models 820 (e.g., 1-N) may classify customer's historical image data 816 based on a positive result of OCR extracted data or by negative labels (e.g., low quality or missing extractions, etc.) against the trained predictive model to predict successful extractions and generate or enhance a previous generated model. In one embodiment, the ML models (e.g., models 812, 1-N) are continuously updated as new user financial interactions occur.

As shown, a series of desired models 812, 1-N, may be fed into the ML Engine 814 as predictor models to select a model that may result in optimized check data OCR extractions (e.g., amount, etc.). The ML model(s) 812 may be trained and continuously improved by analyzing relative success over a large data set, where success is measured by quality of OCR data field extractions. ML models 812 may be focused to generate queries for a specific performance level, for example selecting a focal length in a minimum time (e.g., less than some number of microseconds).

Imagery 804 received from the client device, including the byte object arrays used in the active OCR process, may be stored in the User Account DB 808. User Account DB 808 may also store user profile information that may be used with the Cloud banking system 316 to provide account and profile information based on associated identifiers (IDs). Additionally, as specific funds availability schedules are presented to the user, for example, as rendered on their user device 302 through mobile banking app 304, the historical information may be added to the user's profile, and further be stored in the User Account DB 808.

Alternatively, or in addition to, one or more components of the ML platform 329 may be implemented within the user's mobile device, third party platforms, and a cloud-based system, or distributed across multiple computer-based systems.

The various aspects solve at least the technical problems associated with performing OCR operations pre-deposit, without requiring communication of an image to a remote OCR system. The various embodiments and aspects described by the technology disclosed herein are able to provide image generation at calculated focal lengths, select the highest quality imagery, perform subsequent active OCR operations and improve the remote deposit status mid-experience, before the customer completes the deposit and without requiring the customer to provide additional new images post image quality or OCR failures.

More specifically, the technical solutions disclosed herein allows image generation of both sides of the financial document (e.g., check), without first requiring the user to stop and start the process individual check images and communication of the images to a remote OCR processing system. This solution improves the quality of the check imaging process, accelerates the remote check deposit process, and allows mid-video stream alterations or improvements, for example, real-time image quality guidance or customer inputs (e.g., mid-video stream cancelation), as well as the other technical advantages described throughout this disclosure.

Example Computer System

FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. For example, the example computer system may be implemented as part of mobile computing device 102, client device 302, cloud banking system 316, etc. Cloud implementations may include one or more of the example computer systems operating locally or distributed across one or more server sites.

Computer system 900 may include one or more processors (also called central processing units, or CPUs), such as a processor 904. Processor 904 may be connected to a communication infrastructure or bus 906.

Computer system 900 may also include user input/output device(s) 902, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 918 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 916 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for a client device, comprising:

activating, on the client device, a computer application;

activating, based on receiving a user request to the application, a camera on the client device, wherein the activated camera provides access to a field of view of the camera;

detecting, based on a Light Detection and Ranging (LIDAR) measurement, a first distance of a document surface, wherein the document surface is located at least partially within the field of view of the camera;

selecting, based on the first distance, a focal length for the camera;

forming, from a live image stream generated by the camera, a first set of image objects of at least a portion of a first side of the document;

analyzing the first set of image objects to determine a quality confidence score;

selecting, based on the quality confidence score, a subset of one or more image objects from the first set of image objects;

performing an optical character recognition (OCR) process on one or more of the subset of one or more image objects to extract data fields; and communicating the extracted data fields to a remote server.

2. The computer-implemented method of claim 1, further comprising selecting, based on the first distance, a plurality of focal lengths for the camera and the forming, from the live image stream generated by the camera, the first set of image objects of at least a portion of the first side of the document comprises generating the live stream from multiple ones of the plurality of focal lengths.

3. The computer-implemented method of claim 1, wherein the forming the first set of image objects comprises arranging a plurality of pixels into a plurality of byte arrays.

4. The computer-implemented method of claim 3, wherein the byte arrays comprise a partial frame or an entire frame of the document.

5. The computer-implemented method of claim 1, further comprising, during a document flip action, pausing the forming of the first set of image objects.

6. The computer-implemented method of claim 1, further comprising: detecting, based on repeating the Light Detection and Ranging (LIDAR) measurement of distances from the camera to the document, a steady state position of the client device and the first distance comprises a steady state range of distances.

7. The computer-implemented method of claim 6, wherein the steady state range of distances is determined during a camera calibration.

8. The computer-implemented method of claim 6, wherein the steady state range of distances from the camera to the document exceed a threshold distance during an error condition.

9. The computer-implemented method of claim 6, wherein the steady state range of distances from the camera to the document exceed a rate of change during a flip action.

10. The computer-implemented method of claim 6, wherein the detecting the steady state position further comprises analyzing a measurement waveform of movements by the client device.

11. The computer-implemented method of claim 10, wherein the analyzing the measurement waveform of movements by the client device comprises detecting a signal envelope that includes the steady state range of distances.

12. A system, comprising:

a memory; and at least one processor coupled to the memory and configured to:

activate, on a client device, a computer application;

activate, based on receiving a user request to the application, a camera on the client device, wherein the activated camera provides access to a field of view of the camera;

detect, based on a Light Detection and Ranging (LIDAR) measurement, a first distance of a document surface, wherein the document surface is located at least partially within the field of view of the camera;

select, based on the first distance, a focal length for the camera;

form, from a live image stream generated by the camera, a first set of image objects of at least a portion of a first side of the document;

analyze the first set of image objects to determine a quality confidence score;

select, based on the quality confidence score, a subset of one or more image objects from the first set of image objects;

perform an optical character recognition (OCR) process on one or more of the subset of one or more image objects to extract data fields; and communicate the extracted data fields to a remote server.

13. The system of claim 12, further configured to select, based on the first distance, a plurality of focal lengths for the camera and the forming, from the live image stream generated by the camera, the first set of image objects of at least a portion of the first side of the document comprises generating the live stream from multiple ones of the plurality of focal lengths.

14. The system of claim 12, wherein the forming the first set of image objects comprises arranging a plurality of pixels into a plurality of byte arrays.

15. The system of claim 13, wherein the byte arrays comprise a partial frame or an entire frame of the document.

16. The system of claim 12, further configured to, during a flip action, pause the forming of the first set of image objects.

17. The system of claim 12, further configured to detect, based on repeating the Light Detection and Ranging (LI-DAR) measurement of distances from the camera to the document, a steady state position of the client device and the first distance comprises a range of distances.

18. The system of claim 17, wherein the distances from the camera to the document are within a range of distances for the steady state position.

19. The system of claim 17, wherein the distances from the camera to the document exceed a threshold distance or a rate of change during a flip action.

20. A non-transitory computer-readable device having instructions stored thereon that, when executed by at least one computing device, cause the at least one computing device to perform operations comprising:

activating, on the at least one computing device, a computer application;

activating, based on receiving a user request to the application, a camera on the at least one computing device, wherein the activated camera provides access to a field of view of the camera;

detecting, based on a Light Detection and Ranging (LI-DAR) measurement, a first distance of a document surface, wherein the document surface is located at least partially within the field of view of the camera;

selecting, based on the first distance, a focal length for the camera;

forming, from a live image stream generated by the camera, a first set of image objects of at least a portion of a first side of the document;

analyzing the first set of image objects to determine a quality confidence score;

selecting, based on the quality confidence score, a subset of one or more image objects from the first set of image objects;

performing an optical character recognition (OCR) process on one or more of the subset of one or more image objects to extract data fields; and communicating the extracted data fields to a remote server.

* * * * *